(12) United States Patent
Benkler et al.

(10) Patent No.: US 7,607,708 B2
(45) Date of Patent: Oct. 27, 2009

(54) ADAPTER DEVICE FOR A GRAB HANDLE

(75) Inventors: Olaf Benkler, Neuhausen/Schellbronn (DE); Markus Osswald, Leonberg-Höfingen (DE); Matthias Zierle, Filderstadt (DE)

(73) Assignee: Dr. Ing. h.c. F. Porsche AG, Weissach (DE)

( * ) Notice: Subject to any disclaimer, the term of this patent is extended or adjusted under 35 U.S.C. 154(b) by 0 days.

(21) Appl. No.: 11/940,671

(22) Filed: Nov. 15, 2007

(65) Prior Publication Data

US 2008/0111389 A1    May 15, 2008

(30) Foreign Application Priority Data

Nov. 15, 2006  (DE) ................. 10 2006 053 781

(51) Int. Cl.
*B60N 3/02* (2006.01)
(52) U.S. Cl. .................. 296/1.02; 296/187.05
(58) Field of Classification Search .......... 296/71, 296/1.02, 187.05; 16/110.1
See application file for complete search history.

(56) References Cited

U.S. PATENT DOCUMENTS

| | | | |
|---|---|---|---|
| 6,126,230 A | 10/2000 | Ikeda et al. | |
| 6,431,640 B1* | 8/2002 | Sakuma et al. | 296/187.05 |
| 6,869,119 B2 | 3/2005 | Ito et al. | |
| 2007/0267884 A1* | 11/2007 | Failla et al. | 296/1.02 |

FOREIGN PATENT DOCUMENTS

| | | |
|---|---|---|
| DE | 19747704 A1 | 5/1999 |
| DE | 10140338 A1 | 2/2003 |
| DE | 69720171 T2 | 10/2003 |
| DE | 102004001671 A1 | 8/2004 |
| DE | 102005033080 A1 | 2/2007 |
| EP | 0097219 A2 | 1/1984 |
| EP | 0720934 A1 | 7/1996 |
| EP | 1541411 A2 | 6/2005 |
| FR | 2887196 A1 | 12/2006 |

OTHER PUBLICATIONS

German Office Action dated Nov. 14, 2008.
European Search Report dated May 6, 2009.

* cited by examiner

*Primary Examiner*—Joseph D Pape

(57) ABSTRACT

An adapter device for a grab handle has a deformation element with at least two end regions. The end regions of the deformation element are connected to each other by at least one web and each have at least one fastening element for the grab handle. The deformation element is configured in such a manner that, in a first loading situation (normal use situation), it is supported by the retaining element and, in a second loading situation (crash situation), it is deformed in the region of the at least one web. The grab handle can thus be mounted in an extremely stable manner with regard to loading in a pulling direction, i.e. in the normal use situation, without the energy-absorbing deformation properties of the adapter device being adversely affected in the crash situation.

8 Claims, 3 Drawing Sheets

ADAPTER DEVICE FOR A GRAB HANDLE

CROSS-REFERENCE TO RELATED APPLICATION

This application claims the priority, under 35 U.S.C. § 119, of German application DE 10 2006 053 781.5, filed Nov. 15, 2006; the prior application is herewith incorporated by reference in its entirety.

BACKGROUND OF THE INVENTION

Field of the Invention

The invention relates to an adapter device for a grab handle. The invention also relates to a motor vehicle with at least one adapter device of this type.

Published, non-prosecuted German patent application DE 197 47 704 A1, for example, discloses an adapter device which is configured as a bearing unit for a grab handle which is disposed in the interior of a vehicle and can be grasped manually. The bearing unit includes a base part which is fixed on the vehicle and a bearing bracket part which, by contrast, is retained in a displaceable manner in a possible impact direction of a person. The bearing unit further has at least one deformation element being fitted between the base part and the bearing bracket part. Furthermore, according to DE 197 47 704 A1 it is proposed to retain a roof grab handle, which is configured as a gripping bow, on two spaced-apart bearing bracket parts which are each retained in a displaceable manner via a deformation element. This configuration is relatively complicated to fit and also conceals the risk of the bearing bracket part jamming in the base part during the deformation operation.

Published, non-prosecuted German patent application DE 101 40 338 A1 discloses an adapter device for fitting a grab handle to a wall, preferably in the passenger compartment of a motor vehicle. The adapter device is of an elongated configuration with an at least partially essentially upside down U-shaped cross section, with the outer U-limb being fixable to the wall and a grab handle being fittable to the inner U-limb, and with the U-shaped cross section being composed of at least two partial profiles extending longitudinally.

An adapter device of the type mentioned at the beginning is to be configured as far as possible in such a manner that, first, it can absorb pulling forces when a person is gripping the grab handle or is pulling thereon (normal use situation). Second, the adapter device of this type is to absorb as much energy as possible if an occupant of a motor vehicle impacts, for example with his head, against the grab handle (crash situation).

Known adapter devices have significant defects with regard to their functionality at least in one of the two loading situations, i.e. in the normal use situation or in the crash situation.

BRIEF SUMMARY OF THE INVENTION

It is accordingly an object of the invention to provide an adapter device for a grab handle that overcomes the above-mentioned disadvantages of the prior art devices of this general type, which adapter device is improved over known adapter devices to the effect that it is highly stable in the normal use situation and has significantly improved deformation properties in a crash situation.

According to the invention, an adapter device of the type mentioned at the beginning has a deformation element with at least two end regions. The end regions of the deformation element are connected to each other by at least one web and the end regions each have at least one fastening element for the grab handle. The deformation element is configured in such a manner that, in a first loading situation, it is supported by a retaining element, and that, in a second loading situation, it is deformed in the region of the at least one web. A grab handle can thus be mounted in an extremely stable manner with regard to loading in a pulling direction, i.e. in the normal use situation, without the energy-absorbing deformation properties of the adapter device being adversely affected in the crash situation.

The end regions of the deformation element can advantageously correspond to openings in the retaining element, wherein the end regions can be generally configured as cups and preferably have edge regions which at least partially overlap with the retaining element. These advantageous developments of the invention make it possible for the stability of the adapter device to be further increased in the normal use situation, with the deformation behavior at least not being impaired in the crash situation.

In order to ensure specific and functionally correct deformation in the crash situation, a predetermined buckling line can advantageously be defined in the region of the at least one web.

A desired, predefined deformability of the deformation element can advantageously be set by the at least one web of the deformation element having at least one edge which is notched in order to define a predetermined buckling line.

Other features which are considered as characteristic for the invention are set forth in the appended claims.

Although the invention is illustrated and described herein as embodied in an adapter device for a grab handle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
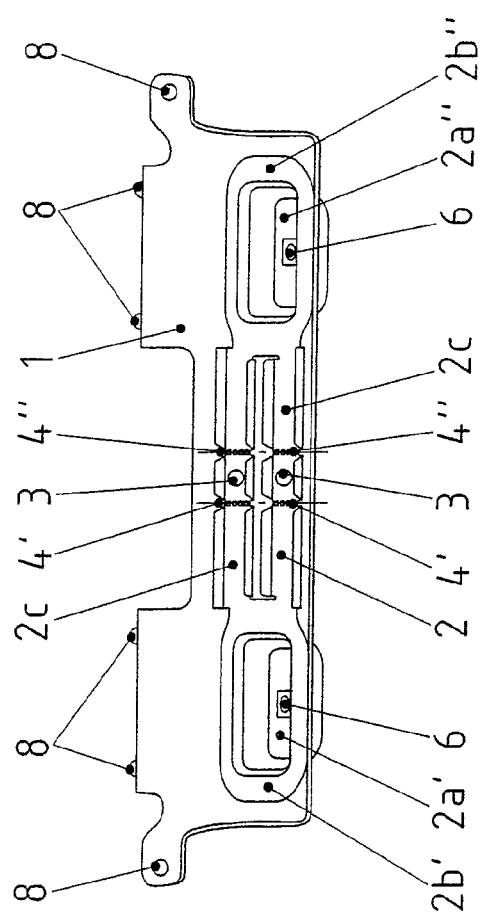
FIG. 1 is a diagrammatic, perspective view of an adapter device.

Referring now to the figures of the drawing in detail and first, particularly, to FIG. 1 thereof, there is shown an adapter device with a retaining element 1 and with a deformation element 2 in a perspective view. The retaining element 1 which forms a bracket can be connected to a body part 7 (see FIG. 4) of a motor vehicle at fastening points 8.

Figure 5:
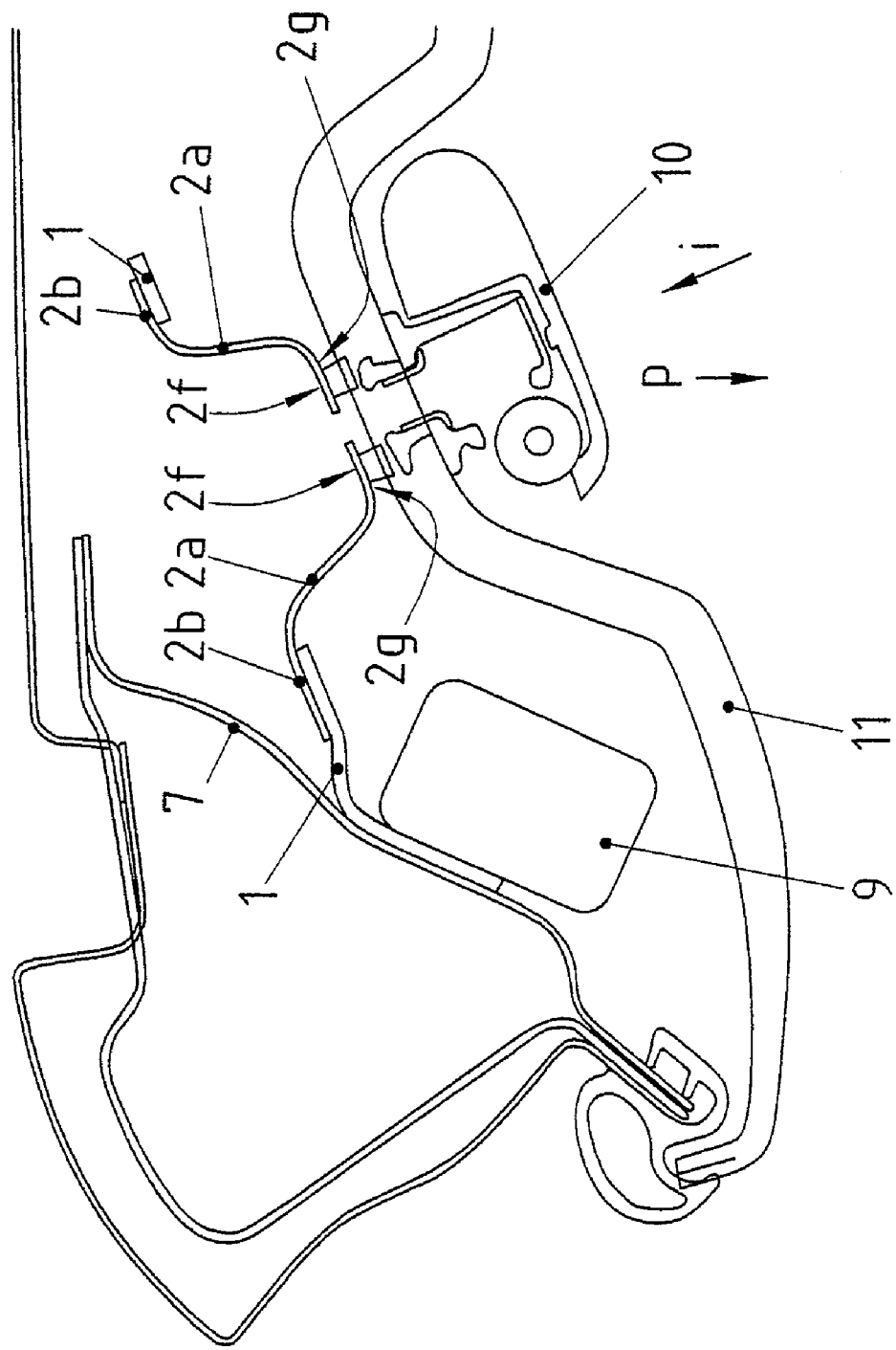
FIG. 5 is a diagrammatic, sectional view through the adapter device with a grab handle.

The deformation element 2 has two end regions with in each case at least one fastening element 6 for a grab handle 10 (see FIG. 5). The grab handle 10 can preferably be of a bow-shaped configuration, with it being possible for the ends of the bow-shaped grab handle 10 to be fastened to the fastening elements 6. The fastening elements 6 are configured, for example, as fastening openings.

The deformation element 2 is illustrated in the drawings, in its none deformed state. In the example shown, the deformation element 2 has two end regions. The at least two end regions of the deformation element 2 are preferably configured as cups 2a', 2a". The cups 2a', 2a" are disposed in such a manner that they penetrate openings 5 (see FIG. 3) of the retaining element 1. The cups 2a', 2a" have edge regions 2b', 2b", the edge regions 2b', 2b" overlapping with the retaining element 1 or resting on the retaining element 1. An undesirable deformation of the deformation element 2 in the normal use situation is prevented in this way.

The deformation element 2 has one or more webs 2c, two in the example shown, which connect the end regions of the deformation element 2 to each other. The at least one web 2c of the deformation element 2 can be connected to the retaining element 1, for example in the center of the web, by a spot weld 3, for example.

In order to set predefined deformation properties of the deformation element 2, the at least one web 2c is configured in such a manner that one or more predetermined buckling lines 4', 4" are defined. A predetermined buckling line 4' or 4" can be brought about, for example, by a reduction in the material thickness, by changed material properties and/or by one or more notches. As illustrated by way of example in FIGS. 1 and 2, the at least one web 2c of the deformation element 2 can have edges which are preferably of angled or bent configuration in relation to the web surface. A predetermined buckling point 4', 4" can be defined, for example, by a notch in the edge of the web 2c.

The predetermined buckling lines 4' and 4" are preferably assigned to the end regions of the deformation element 2, i.e. to the cups 2a' and 2a". Thus, for example in the event of an impact more heavily loading the right cup 2a", a significantly more pronounced deformation would also take place at the right predetermined buckling lines 4" than at the left predetermined buckling lines 4'.

Figure 2:
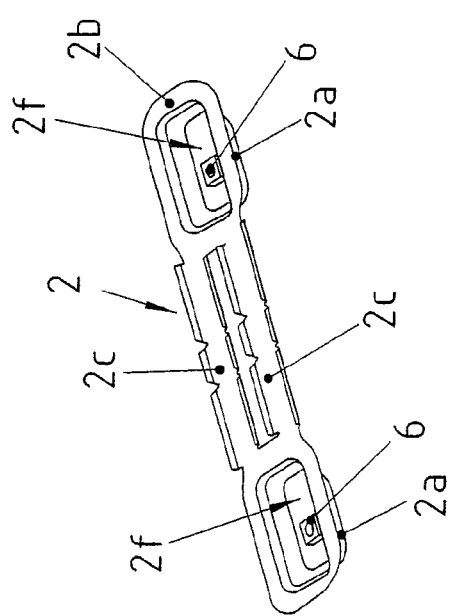
FIG. 2 is a diagrammatic, perspective view of a deformation element.

FIG. 2 shows the deformation element 2 with two webs 2c which connect the end regions of the deformation element 2. In the example shown, the end regions are configured as cups 2a with edge regions 2b. The cups 2a of the deformation element 2 have the fastening elements 6 for the grab handle 10, it being possible for the grab handle 10 to be fastened on the outside 2g (see FIGS. 4 and 5) of the cups 2a, which side lies opposite an inside 2f of the cups 2a.

Figure 3:
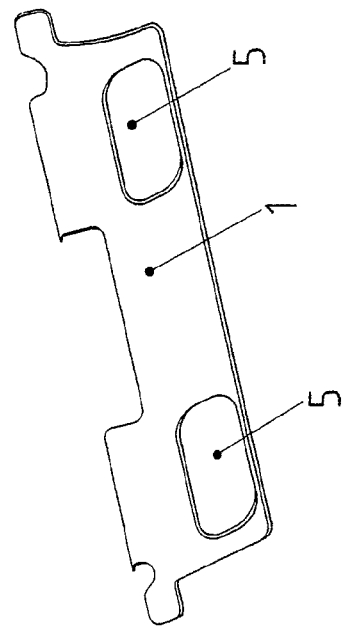
FIG. 3 is a diagrammatic, perspective view of a retaining element.

FIG. 3 shows the retaining element 1, which is configured as a bracket, in a perspective view. The retaining element 1 has two openings 5 which correspond to the cups 2a (see FIG. 2) of the deformation element 2. The openings 5 and the cups 2a are preferably matched to each other in terms of their shape.

Figure 4:
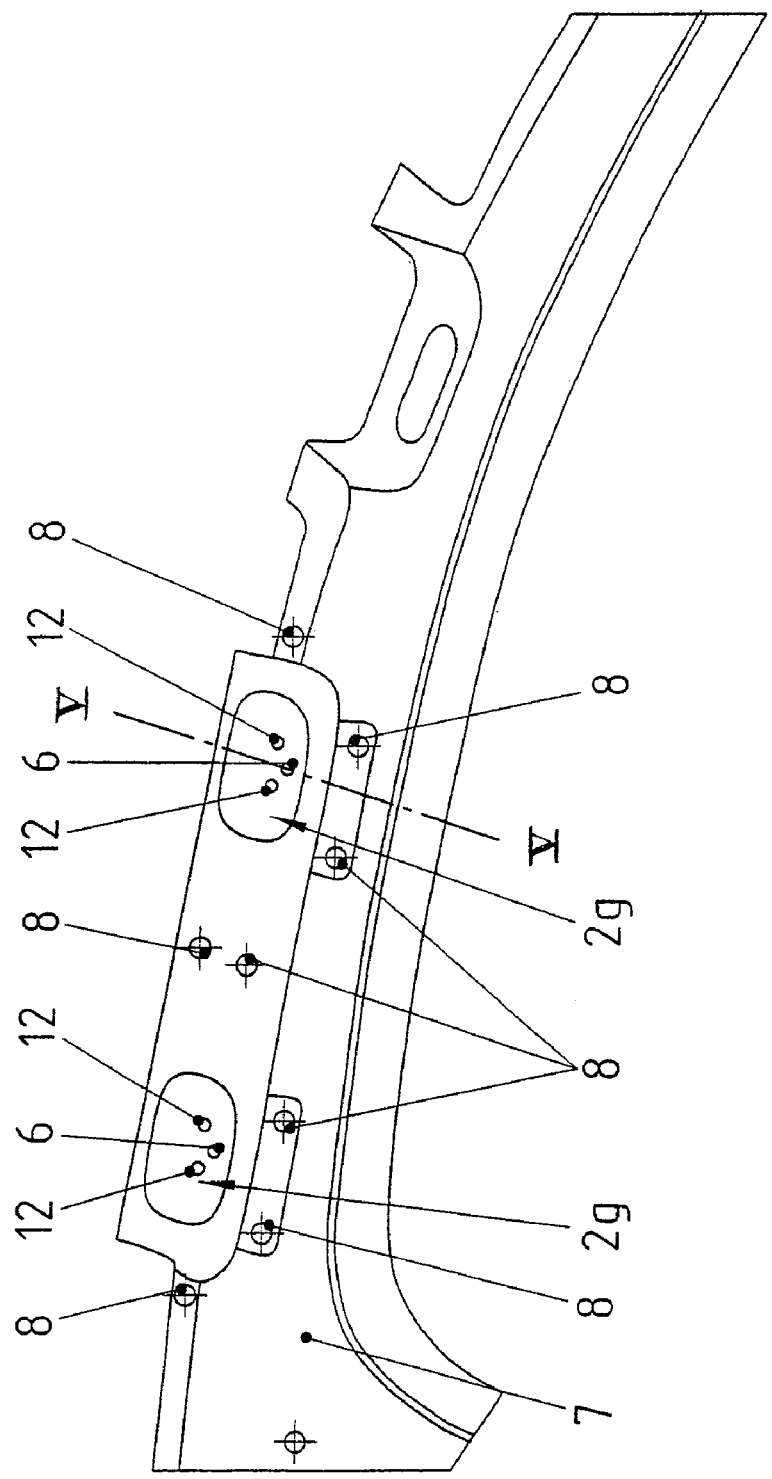
FIG. 4 is a diagrammatic, perspective view of the adapter device and of a body part.

FIG. 4 shows the adapter device fastened to the body part 7 of the motor vehicle. The adapter device is preferably connected to the body part 7 at the fastening points 8. The connection of the retaining element 1 to the body part 7 is preferably realized with a cohesive material joint. The retaining element 1 is preferably welded to the body shell of the motor vehicle at the fastening points 8. In the example shown, the adapter device is fastened to a roof frame above the door of a motor vehicle.

The fastening elements 6, which are configured as fastening openings, for the grab handle 10 (see FIG. 5) can be seen on the outside 2g of the deformation element 2 (see FIGS. 1 and 2). An anti-twist safeguard 12 is provided in particular for the grab handle 10 of, for example, bow-shaped configuration.

FIG. 5 shows a section through the adapter device and the body part 7 according to line V-V shown in FIG. 4. The grab handle 10 is indicated schematically in the unused position. The grab handle 10 is fastened to the outside 2g of the cup 2a of the deformation element 2. The inside 2f of the cup 2a faces a body part 7 and the outside of the vehicle.

The edge region 2b of the cup 2a and the webs 2c, not illustrated specifically in FIG. 5 (see FIGS. 1 and 2) of the deformation element 2 are disposed on that side of the retaining element 1 which faces the outside of the vehicle. The bottom region of the cup 2a, with its inside 2f and its outside 2g, is disposed on that side of the retaining element 1 which faces the passenger compartment.

In the event of loading in a pulling direction P, the edge region 2b of the cup 2a is pressed against the retaining element 1. The retaining element 1 is mounted in a stable manner by its end region, which is generally configured in the form of a cup 2a with edge region 2b, both in the pulling direction P and also laterally, i.e. perpendicular to the pulling direction P. In the event of a loading in the impact direction i, the deformation element 2 can yield, since the cup 2a is mounted moveably in the impact direction i. In the crash situation, upon a loading in the impact direction i, a deformation of the deformation element 2 takes place, in particular in the region of the buckling lines 4', 4" (see FIG. 1). The cup 2a, or 2a', 2a" (see FIG. 1) is initially accelerated in the impact direction and describes a path of movement about the corresponding buckling line 4', 4". The minimal force required in the impact direction i to deform the deformation element 2 can be determined by a corresponding configuration of the at least one web 2c (see FIGS. 1 and 2), for example by a corresponding configuration of notches and/or correspondingly distinctive material properties. The retaining element 1 preferably does not deform in the crash situation. Given an appropriately high level of impact energy, the deformation element 2 together with the cups 2a, 2a', 2a" is moved in the crash situation at least virtually completely onto that side of the retaining element 1 which faces the outside of the vehicle.

The adapter device is preferably disposed in such a manner that a molded head lining 11 of the passenger compartment is situated between the adapter device and the grab handle 10. Between the molded head lining 11 and the body part 7, an airbag 9 is preferably disposed below the adapter device.

The invention claimed is:

1. An adapter device for a grab handle, the adapter device comprising:

a retaining element having openings formed therein; and
at least one deformation element supported by said retaining element and having at least two end regions and at least one web, said end regions of said deformation element being connected to each other by said at least one web and each having at least one fastening element for the grab handle, said end regions are cup shaped and pass through and are disposed in said openings of said retaining device, said deformation element configured such that, in a first loading situation, said deformation element is supported by said retaining element and, in a second loading situation, said deformation element is deformed in a region of said at least one web.

2. The adapter device according to claim 1, wherein said end regions have edge regions which at least partially overlap with said retaining element.

3. The adapter device according to claim 1, wherein said deformation element has at least one predetermined buckling line defined in a region of said at least one web for a deformation of said deformation element in said second loading situation.

4. The adapter device according to claim 3, wherein said at least one web has at least one edge being notched for defining said at least one predetermined buckling line.

5. The adapter device according to claim 3, wherein said predetermined buckling line is defined by a reduction in a material thickness of said at least one web.

6. The adapter device according to claim 3, wherein each of said end regions of said deformation element is assigned said at least one predetermined buckling line.

7. The adapter device according to claim 1, wherein said deformation element is connected in a center of said at least one web to said retaining element.

8. A motor vehicle, comprising:
a body part;
at least one grab handle; and
at least one adapter device containing a retaining element having openings formed therein and at least one deformation element supported by said retaining element and having at least two end regions and at least one web, said end regions of said deformation element connected to each other by said at least one web and each having at least one fastening element for said grab handle, said end regions are cup shaped and pass through and are disposed in said openings of said retaining element, said deformation element configured such that, in a first loading situation, said deformation element is supported by said retaining element and, in a second loading situation, said deformation element is deformed in a region of said at least one web, said grab handle being fastened to said end regions of said adapter device, and said retaining element of said adapter device being fastened to said body part.

* * * * *